Aug. 23, 1966  P. C. TABOR  3,267,495
SEAT STRUCTURE

Filed May 11, 1964  2 Sheets-Sheet 1

INVENTOR.
PAUL C. TABOR
BY
Strauch, Nolan & Neale
ATTORNEYS

Aug. 23, 1966   P. C. TABOR   3,267,495
SEAT STRUCTURE
Filed May 11, 1964   2 Sheets-Sheet 2
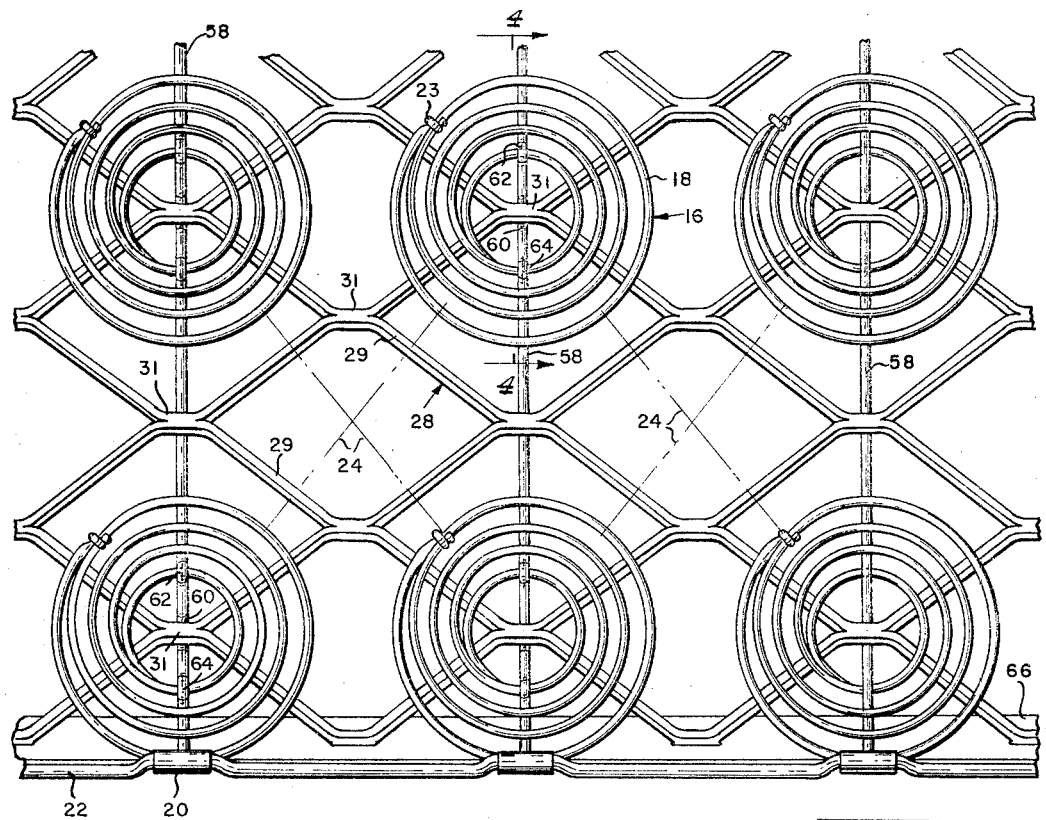
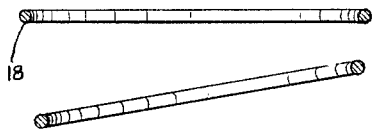
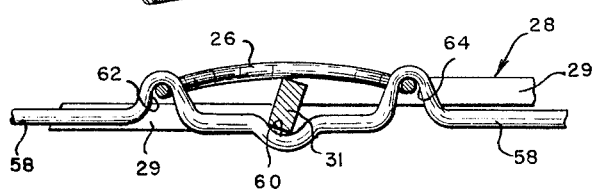
INVENTOR
PAUL C. TABOR
BY *Strauch, Nolan & Neale*
ATTORNEYS

United States Patent Office 3,267,495
Patented August 23, 1966

3,267,495
SEAT STRUCTURE
Paul C. Tabor, Clawson, Mich., assignor, by mesne assignments, to Rockwell-Standard Corporation, a corporation of Delaware
Filed May 11, 1964, Ser. No. 366,254
6 Claims. (Cl. 5—263)

The present invention relates to seat structure and more in particular to a seat spring structure wherein coil springs are united with resilient expanded metal sheeting in special combination.

It is common to use in seats of all kinds an especially those in automotive vehicles metals springs of which the more common are in the form of coils, sinuous or formed wire strips or combinations of both. The term seat as used herein includes the back rest as well as the part upon which the person sits.

A coil spring, when properly designed, may be considered the ideal spring, but it has been found especially in automobile seats that under the normal weight of a seated person the spring seat is subjected to such loads during travel such that some kind of re-enforcement or special attachments for the coil springs is needed.

In prior attempts to solve the problem, coil springs have been combined with other spring structures as for instance straight, sinuous or formed wire strips to form an associated support and tie structure. However, these wire strip springs are mainly costly to produce, and it is very difficult to assemble these wire strips in such relation to the coil springs as to provide the best load distribution. Also considerable labor and further parts are needed to securely attach the coil springs to the individual wire strips. Another considerable problem in combining coil and sinuous wire strips has been found to exist at the junction of the crossed wire strips and fastener wires and clips which move relative to each other under load, thus causing wear due to abrasion and consequently early localized failures in the spring assembly.

The invention provides a homogeneous, integral metal sheet or plate structure as underlying support which extends over the entire width and length of the seat cushion and relatively rigidly supports the coil springs. The invention more specifically provides a relatively rigid homogeneous sheet of expanded metal connected to support the coil springs within the confines of the seat frame.

Expanded metal per se has long been known and used in grills, laths, screenings, walkways and filters, and for a variety of other similar purposes in addition to its use for ornamental purposes.

The major object of the present invention is provide a novel seat spring structure wherein a number of coil springs are connected in novel combination with a supporting sheet of expanded metal.

Another object resides in the provision of a novel springy seat construction wherein a relatively rigid sheet of expanded metal forms the lower support for a number of coil springs.

Other objects and novel features reside in the novel manner of attaching the resilient sheet of the expanded metal to a seat frame, the stretching of the expanded metal sheet over and around obstacles forming parts of the seat frame structure without having to cut the sheet, and novel arrangements for attaching the ends of the coil springs to the sheet of expanded metal.

A preferred embodiment of the present invention is described in the following detailed description in connection with the appended drawings wherein:

FIGURE 3 is another fragmentary plan view of a modified spring structure which may be used in the cushion of FIGURE 1 illustrating a preferred manner of attching the coil springs to the sheet of expanded metal; and FIGURE 4 is a cross section through a joint of the expanded metal sheet substantially on line 4—4 in FIGURE 3 showing the coil spring attachment to the expanded metal sheet.

Figure 1:
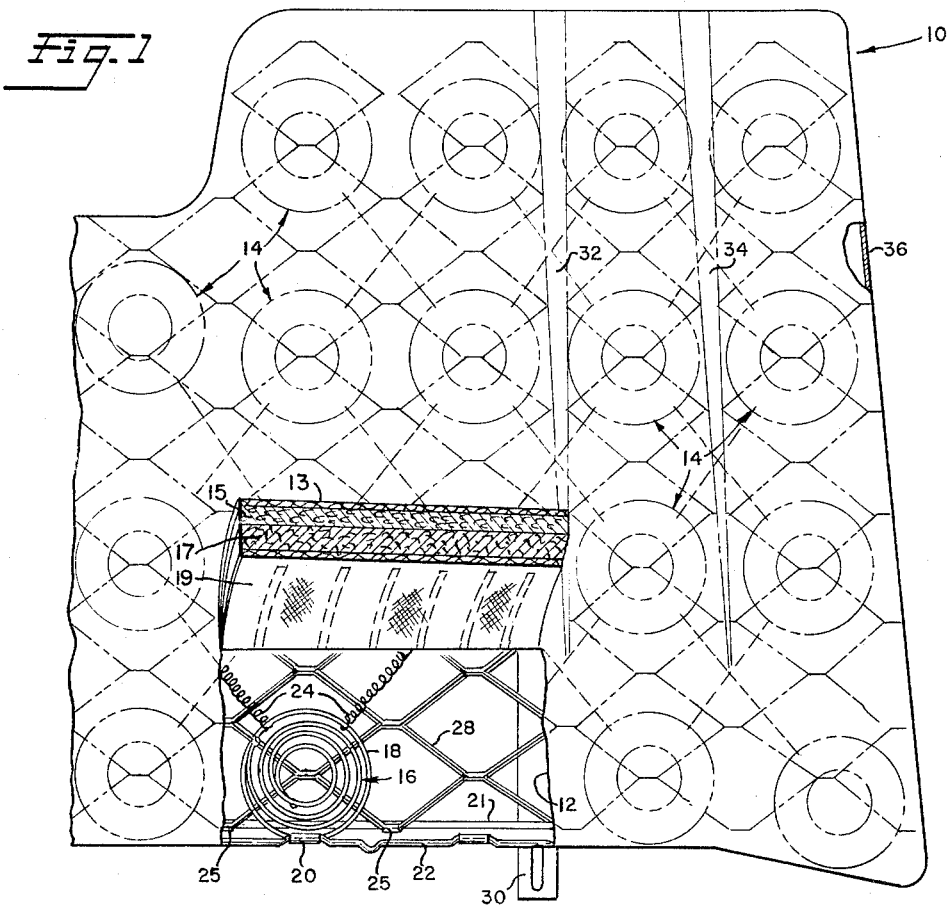
FIGURE 1 is a plan view of a seat cushion (either back or bottom) with parts of the upholstery broken away to afford an internal view of the spring structure and associated pad and upholstery fabric layer.

Referring to FIGURE 1, part of a seat cushion 10 which in this instance is a seat back for an automobile seat assembly, as shown in elevation. It will be readily understood that the novel spring structure to be described may be used for any other seat cushion and for seats other than automotive.

Seat cushion 10 is covered with the usual padding and upholstery fabric layer as indicated at 12, and FIGURE 1 is broken away to show the top of the metal spring structure 14 underneath the padding. FIGURE 1 shows in cross section a more or less conventional type of pad and upholstery arrangement comprising an upper layer 13 of suitable upholstery cloth, an underlying layer 15 of fibrous pad material such as cotton, a padding layer 17 of sisal fibres and a bottom layer 19 of some rough cloth such as burlap. Suitable means for attaching the padding and fabric layer in place may be provided but such is not shown because it is not involved in the invention.

Metal spring structure 14 is comprised of a series of spaced side by side coil wire springs 16 of a well known substantially helical conical type in which the smaller diameter stiffer portion of the coil spring unit is at the bottom of the spring, and the larger diameter more readily flexible portion of the coil spring unit is at the upper part of the spring. The springs are arranged in the assembly substantially uniformly spaced apart with their axes generally parallel, and with their upper and lower ends in substantially coextensive planes.

Figure 2:
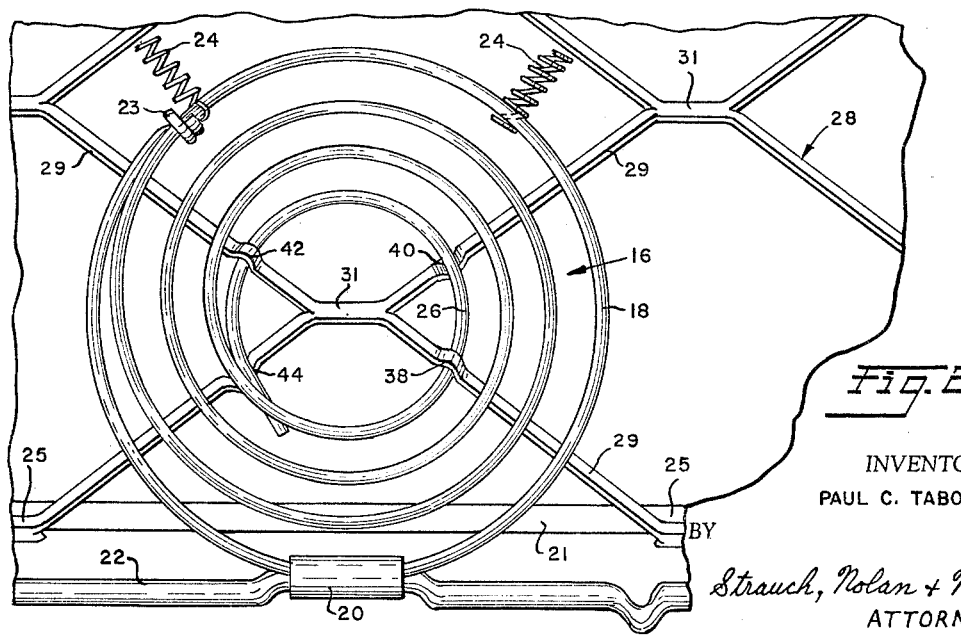
FIGURE 2 is an enlarged fragmentary view showing the spring structure of FIGURE 1 in increased detail and illustrating one manner of attaching the coil springs to the sheet of expanded metal.

Coil springs 16 are distributed in rows within the cushion 10 at predetermined distances from each other, and the upper or top coils 18 of the laterally outer rows of springs are secured as by bent metal clips 20 directly to an upper relatively stiff border wire or top rim 22 which extends all around the upper outer edge of the cushion 10. Top rim wire 22 floats with the coil springs during expansion and contraction of the coil springs and is provided mainly to preserve the contour of the cushion and for atttachment of the trimming. The remaining coil springs are attached at their upper coils 18 to each other and to the outer rows of coil springs by transversely extending flexible small diameter coiled spring ties 24. As shown in FIGURE 2, the upper coil 18 of each coil spring includes the terminal connection 23 to the next lowest coil of the unit to prevent the wire edge from penetrating the upholstery.

The rigid frame member 21 extends all around the periphery of the cushion unit 10, and a sheet 28 of expanded metal extends across the frame with all of its opposite edges securely anchored to frame 21 as by welded joints indicated at 25.

The sheet of expanded metal 28 is made in the usual way, as by parallel slitting a flat sheet of steel stock and die drawing the strands apart in a single operation. As shown the expanded sheet 28 consists of integrally united strands 29 extending angularly between generally parallel bridge sections 31, the appearance being a diamond-shaped configuration pattern. The cut edges of the strands and bridges, due to twisting of the metal in the stretched sheet, are oriented to form the top and bottom surfaces of the sheet 28. The width of each strand 29 is the thickness of the original sheet, and the depth or thickness of each strand is dependent on the distance between slits.

Expanded metal shoots and methods of forming them are well known, as shown in United States Letters Patent to Arey 1,674,613 issued June 19, 1928 to which attention is directed for further details of structure and configuration.

The bottom coil 26 of each coil spring unit 16 is securely anchored on expanded metal sheet 28. The expanded metal sheet 28 is contoured across the relatively rigid seat frame, and may be easily die formed over and around obstacles such as an intermediate frame mount member 30 shown in FIGURE 1.

The expanded metal sheet 28 is also die formed to comformably follow the edge contour of the seat frame. For instance in FIGURE 1 the expanded metal sheet 28 is kinked at two locations 32 and 34 in wedge shaped formation to allow the expanded metal deck to follow the inclined side 36 of the seat frame without having to cut off portions of the expanded metal.

One manner of securing the smaller lower ends of springs 16 to the expanded metal sheet 28 is illustrated in FIGURE 2. At each predetermined location for a coil spring, strands 29 emanating from an expanded metal bridge section 31 are shaped to form kinks 38, 40, 42 and 44 through which the bottom coil 26 of the coil spring is wound as shown. Starting at kink 38 and proceeding clockwise around the bridge section 31 it is noted that the kinks are oriented alternately in downwardly and upwardly open directions, so that pairs of notches opposite each other in the aligned diagonal strands are oriented in the same direction. Thus, in FIGURE 2 where the kinks at 38 and 42 are open downward, the kinks at 40 and 44 are open in the opposite direction, upward. In assembly the bottom coil 26 is wound through downwardly open kinks 38 and 42 and snaps in place into the upwardly open kinks 40 and 44 by which the coil spring is locked onto the expanded metal sheet 28.

Another and sometimes preferred manner of securing coil springs 16 to the expanded metal sheet 28 is illustrated in FIGURE 3 and 4. Preformed relatively stiff heavy tie wires 58, with loops 60, 62 and 64 formed therein to conform to the predetermined locations of the coil springs, are welded at opposite ends to a lower rigid frame member 66. Wires 58 extend across the frame on the opposite side from coil springs 16, and the parts are so dimensioned and located that an expanded metal bridge 31 rests within each upwardly open loop 60. Loops 62 and 64 are equally spaced from loop 60 and are downwardly open, with their rounded upwardly projecting ends protruding between strands 29 radiating from the bridge. Thus when bottom coil 26 of the coil spring is wound through the loops 62 and 64 it tightly overlies the bridge 31 and is thereby securely fastened in place upon the metal sheet 28.

In this construction the lower end of each coil spring unit 16 is held against both lateral and longitudinal displacement. Lower coil 26 may bend as shown in passing over bridge 31, and this combines with the loop 60 to grip the metal sheet 28.

In its preferred embodiment therefore the invention provides a seat construction wherein a sheet of expanded metal extends across the seat frame, a series of spaced side by side coil springs are supported on the sheet with their lower ends anchored to the sheet, and the upper ends of the coil springs are overlaid by the usual upholstery which may comprise the usual padding and upholstery fabric.

The present invention may be embodied in other specific forms without departing from the spirit and essential characteristics thereof, therefore, the present embodiments are to be considered in all respects as illustrative only and not restrictive, the scope of the present invention being indicated by the appended claims rather than by the foregoing description.

What is claimed and desired to be secured by Letters Patent is:

1. A seat assembly comprising a rigid frame, an expanded metal sheet secured across said frame, a series of side by side coil springs having corresponding ends secured supportingly to said sheet and extending away from said sheet, and an upholstery layer on said frame overlying the other ends of said coil springs.

2. The seat assembly defined in claim 1, wherein the bottom coil of each said coil spring adjacent the expanded metal sheet is wound into interstices of the expanded metal sheet structure to constitute said means securing the coil springs to the sheet.

3. The seat assembly defined in claim 1, wherein said means for securing the coil springs to the expanded metal sheet comprises tie members anchored at opposite ends to the frame and formed to interlock with the sheet structure and said corresponding bottom coils of said coil springs.

4. In a seat assembly comprising a rigid frame, a relatively rigid sheet of expanded metal extending across said frame, a series of side by side coil springs upstanding from said sheet, means supportingly securing said sheet to the adjacent ends of said coil springs comprising tie wires extending below across the frame below the sheet with looped sections of said tie wires projecting through said sheet to extend over the bottom coils of said springs to hold said springs against said metal sheet, and an upholstery layer overlying the other ends of said springs.

5. In the seat assembly defined in claim 4, said expanded metal sheet comprising spaced bridges located between angularly extending integral strands, and the lower coil of each said spring being disposed to surround one of said bridges from above, and each tie wire having a section extending between said looped sections at each coil in operative engagement with the underside of said bridge.

6. In the seat assembly defined in claim 4, each tie wire at each coil spring being successively looped over one side of the bottom coil, looped under a section of said sheet of expanded metal and then looped over the other side of the bottom coil.

References Cited by the Examiner

UNITED STATES PATENTS

| | | | |
|---|---|---|---|
| 1,295,296 | 2/1919 | Francisco | 5—266 X |
| 1,410,039 | 3/1922 | Steinbach | 5—263 X |
| 2,155,792 | 4/1939 | Johnson | 5—263 X |
| 2,622,662 | 12/1952 | Caughey | 5—263 X |
| 2,676,647 | 4/1954 | Smith | 5—266 X |
| 2,685,329 | 8/1954 | Stubnitz | 5—263 X |
| 2,728,381 | 12/1955 | Conrad | 5—275 X |
| 2,909,216 | 10/1959 | Stern et al. | 5—266 X |
| 3,080,579 | 3/1963 | Gordon | 5—354 |
| 3,148,872 | 9/1964 | Grupen | 267—91 |

FRANK B. SHERRY, *Primary Examiner.*

C. A. NUNBERG, *Assistant Examiner.*